United States Patent [19]

Farrell

[11] 4,414,103

[45] Nov. 8, 1983

[54] SELECTIVE REMOVAL AND RECOVERY OF AMMONIA AND HYDROGEN SULFIDE

[75] Inventor: Thomas R. Farrell, Hercules, Calif.

[73] Assignee: Chevron Research Company, San Francisco, Calif.

[21] Appl. No.: 366,892

[22] Filed: Apr. 9, 1982

[51] Int. Cl.³ ............... C10G 45/02; C10G 31/08; B01D 3/00

[52] U.S. Cl. ............... 208/212; 208/254 H; 55/70; 55/73

[58] Field of Search ............... 208/212, 254 H; 55/70, 55/73

[56] References Cited

U.S. PATENT DOCUMENTS

| | | | |
|---|---|---|---|
| 3,340,182 | 9/1967 | Berkman et al. | 208/212 |
| 3,356,608 | 12/1967 | Franklin | 208/212 |
| 3,365,374 | 1/1968 | Short et al. | 208/212 X |
| 3,518,166 | 6/1970 | Klett | 208/212 X |
| 3,531,395 | 9/1970 | Urban | 208/108 |
| 3,972,693 | 8/1976 | Wiesner et al. | 55/42 |
| 4,088,735 | 5/1978 | Bratzler et al. | 423/219 |
| 4,287,051 | 9/1981 | Curtin | 208/254 H |

Primary Examiner—Delbert E. Gantz
Assistant Examiner—O. Chaudhuri
Attorney, Agent, or Firm—D. A. Newell; S. R. LaPaglia; E. A. Schaal

[57] ABSTRACT

A hydrocarbon material is subjected to severe hydrotreatment and washed with only enough water to absorb the bulk of the $H_2S$ but only a fraction of the $NH_3$ present in the hydrocarbon material. The washed hydrotreated hydrocarbon material is separated from the water stream, and then a vapor phase is separated from the hydrocarbon material in a high pressure separator. The vapor phase is scrubbed with water to form an aqueous solution of $NH_3$ which contains only a minor amount of $H_2S$ (an $NH_3$ to $H_2S$ ratio of at least 6:1).

1 Claim, 1 Drawing Figure

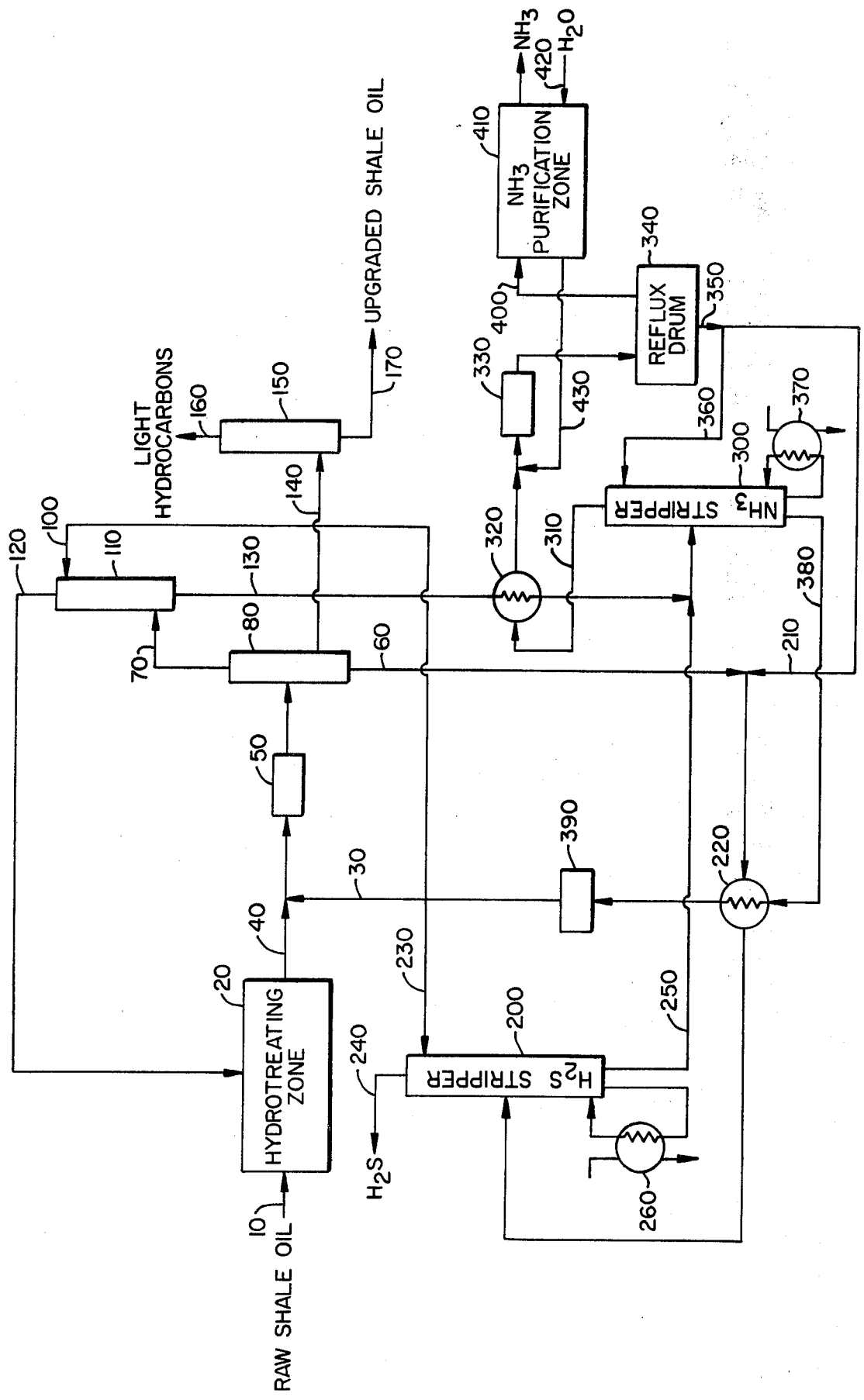

SELECTIVE REMOVAL AND RECOVERY OF AMMONIA AND HYDROGEN SULFIDE

BACKGROUND OF THE INVENTION

Hydrocarbon oils derived from petroleum and similar sources contain varying amounts of nitrogen compounds and sulfur compounds. In the course of refining the oils it is often desirable to remove such compounds because they impart undesired properties such as disagreeable odor, corrosivity, poor color, and the like to saleable products. In addition, the compounds may have deleterious effects in various catalytic refining processes applied to oils, the nitrogen compounds in particular deactivating certain hydrocracking catalysts and tending to cause excessive gas and coke production in cracking processes. Various schemes have been devised for removing the nitrogen and sulfur compounds from oils, probably the most common and best suited process being catalytic hydrofining wherein the nitrogen and sulfur compounds are converted to $NH_3$ and $H_2S$ by reaction with hydrogen, usually promoted by the use of elevated temperatures and pressures and hydrogenation catalysts. Similar reactions of the nitrogen and sulfur compounds with hydrogen to form $NH_3$ and $H_2S$ also occur in other processes such as thermal and catalytic cracking, reforming, and hydrocracking, which are not specifically designed for this purpose. There are thus produced various reaction effluents containing $NH_3$ and $H_2S$.

The removal of $HN_3$ and $H_2S$ from such hydrocarbon reaction effluent streams may be accomplished by scrubbing with water, preferably at elevated pressure and low temperature. To obtain the desired extent of removal, however, it is often necessary to use a large amount of water so that a dilute aqueous solution of $NH_3$ and $H_2S$ is formed. This sour water generally has to be treated to remove the $NH_3$ and $H_2S$ before the water can be discharged under an NPDES permit.

In a typical prior art process for the upgrading of raw shale oil, the oil is subjected to mild hydrotreating conditions in order to remove the reactive metallic organic compounds commonly found in shale oil, for example: iron, arsenic, nickel, and vanadium. These compounds deposit on hydrotreating catalysts and eventually cause the catalyst to lose its hydrotreating activity. Moreover, the contaminated catalyst is not economically regenerable. As a result, the catalyst of choice is usually a low-cost, high-metal-capacity catalyst which is inherently unsuitable for the severe hydrotreating ultimately needed for complete upgrading of shale oil. Therefore, this mild hydrotreating is only the first step in the overall process. In the second step, a high activity catalyst is used at severe hydrotreating conditions to convert the shale oil nitrogen to $NH_3$. This catalyst need not be able to withstand metallic compounds since they are essentially removed in the first step; the catalyst formulations can thus be optimized for nitrogen conversion. In one prior art process, the shale oil is subjected to a third step of upgrading in which waxy compounds are preferentially hydrocracked by means of a shape-selective catalyst in order to reduce the pour point of the shale oil.

Each of these prior art upgrading steps produces some $NH_3$ and $H_2S$ from the nitrogen and sulfur compounds contained in the shale oil. As described previously, the $NH_3$ and $H_2S$ are removed from the reaction effluent streams by scrubbing with water at elevated pressure and low temperature to form dilute aqueous solutions of $NH_3$ and $H_2S$ called sour water. In a typical prior art recovery process, these sour water streams are combined and fed to interconnected distillation columns operated at superatmospheric pressures wherein the $NH_3$ and $H_2S$ are recovered separately by stripping distillation.

$H_2S$ vapors are withdrawn overhead from one column ($H_2S$ stripper), and the bottoms from that column is passed to another column ($NH_3$ stripper) where $NH_3$ vapors are recovered by partially condensing the overhead vapors and recycling a portion of the condensate to the first column. Purified water is withdrawn as bottoms from the second column. This process works well for recovering $NH_3$ and $H_2S$ from petroleum-derived effluent streams where the $NH_3$ to $H_2S$ weight ratio is typically 0.5, but, when the effluent stream has a high $NH_3$ to $H_2S$ ratio (such as found in effluent streams from shale oil hydrotreating), ammonia levels further build up in the $H_2S$ stripper column feed due to the ammonia in the recycle condensate stream. This further increase of the $NH_3$ to $H_2S$ ratio exacerbates an already difficult removal of $H_2S$ in the $H_2S$ stripper column and at a certain feed $NH_3$ to $H_2S$ ratio, the removal of $H_2S$ becomes unfeasible.

SUMMARY OF THE INVENTION

In the process of the present invention, a hydrocarbon material, having a low metals content and containing at least 3 parts by weight nitrogen per 1 part sulfur, is subjected to severe hydrotreatment in the presence of hydrogen, wherein most of the nitrogen in the hydrocarbon material is converted to ammonia, and wherein most of the sulfur in the hydrocarbon material is converted to hydrogen sulfide. The hydrotreated hydrocarbon material is then washed with only enough water to absorb the bulk of the hydrogen sulfide but only a fraction of the ammonia present in the hydrocarbon material, thereby forming a washed hydrotreated hydrocarbon material containing a vapor phase which contains ammonia plus a minor amount of hydrogen sulfide, and a first sour water stream comprising water, ammonia and hydrogen sulfide. Then the washed hydrotreated hydrocarbon material is separated from the first sour water stream, and the vapor phase present in the washed hydrotreated hydrocarbon material is separated from the washed hydrotreated hydrocarbon material in a high pressure separator, producing a liquid hydrotreated hydrocarbon material and a vapor phase. The vapor phase is scrubbed with water to form a second sour water stream containing only a minor amount of $H_2S$. The first sour water stream is stripped in an $H_2S$ stripper which produces an overhead stream of $H_2S$ essentially free of $NH_3$ and a bottoms stream of $NH_3$, $H_2S$ and water. The bottoms stream then joins the second sour water stream and is stripped in an ammonia stripper, with an overhead vapor comprising water, hydrogen sulfide and ammonia being withdrawn in one stream, and a bottoms liquid comprising stripped water being withdrawn in another stream. The overhead vapor from the ammonia stripper is partially condensed to form an uncondensed portion comprising ammonia vapors substantially free of hydrogen sulfide and water, and a condensed portion comprising water, hydrogen sulfide and ammonia. Part of the condensed portion is returned to the ammonia stripper and another part of the condensed portion is recycled to the hydrogen sulfide stripper.

BRIEF DESCRIPTION OF THE DRAWINGS

In order to facilitate the understanding of this invention, reference will now be made to the appended drawing of a preferred embodiment of the present invention. The drawings should not be construed as limiting the invention but are exemplary only.

The drawings are a process diagram of one preferred embodiment of the present invention.

DESCRIPTION OF THE PREFERRED EMBODIMENTS

In the broadest application of the present invention, only enough water is used in the effluent stream to absorb the bulk of the $H_2S$ but only a fraction of the $NH_3$ present in the hydrocarbon material. Then the effluent stream is separated from the hydrocarbon material and then a vapor phase is separated from the hydrocarbon material. The vapor phase is scrubbed with water to form an aqueous solution of ammonia having an ammonia to hydrogen sulfide ratio of at least 6:1.

The term "stripping" is used herein to characterize the distillation or fractionation as carried out by passing hot vapors or gas generated or introduced at the bottom of multiple-stage contacting columns upward through descending liquid, whereby the concentration of the most volatile component in the liquid decreases during its descent. The distillation zone comprises one or more such columns and appurtenances conventionally associated therewith.

The hydrocarbon material treated by this process should have a low metals content. There are various ways of achieving a low metals content, such as mild hydrotreating, recycle coking, or removal of the highest boiling fraction by distillation.

The operation of the process will now be explained with reference to the drawings, illustrating a preferred embodiment of the invention.

In this embodiment, the shale oil has been previously subjected to recycle coking to yield a cracked, low pour point shale oil with a nominal 850° F. true boiling end point. This shale oil contains about 18,000 parts nitrogen, 5,400 parts sulfur, and 18 parts of combined metals (mainly iron and arsenic) per million parts shale oil.

The shale oil is passed through inlet pipe 10 to hydrotreating zone 20 for the primary purpose of reducing the nitrogen content to about 1,000 parts or less. The hydrotreating zone uses two types of catalyst in series. The first catalyst is usually a low-cost, high-metal-capacity catalyst. It removes essentially all of the 18 parts of metals. The second catalyst is usually optimized with high hydrogenation activity and little or no cracking activity. In the course of the nitrogen removal reactions, the sulfur content is also reduced to about 100 parts or less.

In the present invention, a limited amount of scrubbing water (about 1.8 gallons per barrel of shale oil) is added via line 30 to reactor effluent in line 40 for the purpose of absorbing only enough $NH_3$ to assure bulk co-absorption of the $H_2S$. Thus, after cooling in cooler 50 and withdrawal of the sour water in line 60, the remaining vapor phase in line 70 leaving HP separator 80 contains only a small amount of $H_2S$. The sour water in line 30 contains about 20 wt. % $NH_3$ and 7.6 wt. % $H_2S$ when the recycle gas rate is about 11,000 standard cubic feet per barrel of shale oil and when the pressure in HP separator 80 is about 1,500 psia. The vapor in line 70 contains about 0.5 mole % $NH_3$ and about 0.024 mole % $H_2S$. The $NH_3$ and $H_2S$ are removed by countercurrent contact with scrubbing water from line 100 in absorber 110. When the scrubbing water rate in line 100 is about 5.4 gallons per barrel of shale oil, the $NH_3$ content of the recycle gas in line 120 is reduced to less than 0.025 mole % and the $H_2S$ content is reduced to less than 0.001 mole % with three ideal stages of contact in absorber 110 which is operated at about 140° F. This operation would result in about 5.3 wt. % $NH_3$ and 0.5 wt. % $H_2S$ in the sour water in line 130. The liquid hydrocarbon phase leaves the HP separator 80 via line 140 to stripping zone 150 where light hydrocarbons are removed via line 160 to yield shale oil in line 170 which contains about 1,000 parts by weight or less nitrogen and 100 parts or less sulfur per million parts shale oil.

Sour water in line 60 with an $NH_3$ to $H_2S$ ratio of about 2.6 is fed to $H_2S$ stripper 200 after joining recycle solution from line 210 and preheating in exchanger 220. Cold scrubbing water is added to the top of $H_2S$ stripper 200 via line 230 to reduce the $NH_3$ content of the $H_2S$ product in line 240 to about 200 ppm or less, and to dilute the $H_2S$ stripper bottoms in line 250 to about 15 wt. % $NH_3$. Heat for distillation is added to $H_2S$ stripper 200 via reboiler 260 which is preferably heated with steam. Operating conditions for the $H_2S$ stripper 200 in this case are about as follows:

Pressure, psia: 330
Bottom temperature, °F.: 350
Overhead temperature, °F.: 100
Scrubbing water rate,
gallons per barrel of shale: 4.1

The $NH_3$ to $H_2S$ ratio of the $H_2S$ stripper bottoms is raised to about 6 to 1 by weight by virtue of the $H_2S$ removed overhead. As noted in the prior art, complete separation of the $H_2S$ from an aqueous solution containing $NH_3$ is not possible, even at temperatures as high as 450° F. $H_2S$ stripper bottoms in line 250 flows to $NH_3$ stripper 300 after joining preheated sour water from line 130. Overhead vapors in line 310 are partially condensed in exchanger 320 and condenser 330 and flows to reflux drum 340. The condensed liquid in line 350 contains about 50 wt. % $NH_3$ and 16.5 wt. % $H_2S$. Some of the condensed liquid is returned via line 360 as reflux to $NH_3$ stripper 300 and the balance recycles to $H_2S$ stripper 200 via line 210. Heat for distillation is added to $NH_3$ stripper 300 via reboiler 370 which is preferably heated with steam. Operating conditions for the $NH_3$ stripper in this case are about as follows:

Pressure, psia: 78
Bottom temperature, °F.: 310
Overhead temperature, °F.: 240
Reflux drum temperature, °F.: 120

$NH_3$ stripper bottoms in line 380 will contain less than 1,000 ppm each of $NH_3$ and $H_2S$ and preferably less than 100 ppm each. This stripped water is cooled in exchanger 220 and cooler 390 and then used as scrubbing water. Vapor leaving reflux drum 340 via line 400 contains about 96% $NH_3$ and minor amounts of $H_2$ and water. This vapor is fed to $NH_3$ purification zone 410 where additional scrubbing water in line 420 is used to remove the $H_2S$ and recycle it via line 430 and eventually lines 350 and 210 to the $H_2S$ stripper 200.

While the present invention has been described with reference to specific embodiments, this application is intended to cover those changes and substitutions which may be made by those skilled in the art without departing from the spirit and scope of the appended claims.

What is claimed is:

1. A method of treating a hydrocarbon material containing at least 3 parts by weight nitrogen per 1 part sulfur comprising:

(a) hydrotreating said hydrocarbon material in the presence of hydrogen, wherein most of the nitrogen remaining in the hydrocarbon material is converted to ammonia, and wherein most of the sulfur remaining in the hydrocarbon material is converted to hydrogen sulfide;

(b) washing said hydrotreated hydrocarbon material with only enough water to absorb the bulk of the hydrogen sulfide but only a fraction of the ammonia; thereby forming a washed hydrotreated hydrocarbon material containing ammonia and hydrogen sulfide in a vapor phase, and a first sour water stream comprising water, ammonia and hydrogen sulfide;

(c) separating said washed hydrotreated hydrocarbon material from the first sour water stream, and separating a vapor phase from said washed hydrotreated hydrocarbon material in a high pressure separator;

(d) scrubbing said vapor phase with water to produce a second sour water stream containing ammonia with an ammonia to hydrogen sulfide ratio of at least 6:1;

(e) stripping said first sour water stream in a hydrogen sulfide stripper;

(f) withdrawing overhead vapor from said hydrogen sulfide stripper, said vapor comprising hydrogen sulfide essentially free of ammonia;

(g) withdrawing bottoms liquid from said hydrogen sulfide stripper, said liquid comprising water, hydrogen sulfide and ammonia;

(h) adding said bottoms liquid to said second sour water stream;

(i) stripping said second sour water stream in an ammonia stripper;

(j) withdrawing overhead vapor from said ammonia stripper, said vapor comprising water, hydrogen sulfide, and ammonia;

(k) withdrawing bottoms liquid from said ammonia stripper, said liquid comprising stripped water;

(l) partially condensing said overhead vapor from said ammonia stripper to form an uncondensed portion comprising ammonia vapors substantially free of hydrogen sulfide and water, and a condensed portion comprising water, hydrogen sulfide and ammonia;

(m) returning a part of said condensed portion to said ammonia stripper; and (n) recycling another part of said condensed portion to said hydrogen sulfide stripper.

* * * * *

UNITED STATES PATENT AND TRADEMARK OFFICE
CERTIFICATE OF CORRECTION

PATENT NO. : 4,414,103
DATED : November 8, 1983
INVENTOR(S) : Thomas R. Farrell

It is certified that error appears in the above-identified patent and that said Letters Patent are hereby corrected as shown below:

Col. 1, Line 31, "HN$_3$" should read --NH$_3$--

Signed and Sealed this

Fifth Day of June 1984

[SEAL]

Attest:

GERALD J. MOSSINGHOFF

Attesting Officer    Commissioner of Patents and Trademarks